United States Patent [19]

Wu

[11] Patent Number: 5,087,040

[45] Date of Patent: Feb. 11, 1992

[54] GOLF CART WHEEL FRAME MOUNTING STRUCTURE

[76] Inventor: Ching-Chang Wu, No. 35-1, Jih Hsin Street, Tu Cheng Hsiang, Taipei Hsien, Taiwan

[21] Appl. No.: 749,360

[22] Filed: Aug. 23, 1991

[51] Int. Cl.⁵ .......................... A63B 55/08; B62B 1/04
[52] U.S. Cl. .................. 273/32 E; 280/646; 280/DIG. 6
[58] Field of Search ............... 273/32 E; 280/DIG. 6, 280/646

[56] References Cited

U.S. PATENT DOCUMENTS

| | | | |
|---|---|---|---|
| 2,714,012 | 7/1955 | Berger | 280/DIG. 6 |
| 2,717,785 | 9/1955 | Ray | 280/DIG. 6 |
| 2,725,240 | 11/1955 | Johnson, Jr. | 280/DIG. 6 |
| 2,781,202 | 2/1957 | Odin | 280/DIG. 6 |
| 4,793,622 | 12/1988 | Sydlow | 280/646 |

*Primary Examiner*—William H. Grieb
*Assistant Examiner*—Steven B. Wong
*Attorney, Agent, or Firm*—Varndell Legal Group

[57] ABSTRACT

A golf cart wheel frame mounting structure comprising a wheel frame holder secured to a golf cart's main frame by a mounting plate, a pressure plate and a lock screw; a shaft fastened in the wheel frame holder at the bottom to hold a pair of left-hand wheel frames and a pair of right-hand wheel frames permitting the left-hand and right-hand wheel frames to be pivoted thereto; two wheel holders pivotably secured to the left-hand and right-hand wheel frames at the bottom for holding two wheels; and a foldable frame having two opposite ends pivotably secured to one of said left-hand wheel frames and one of the right-hand wheel frames. Through the foldable frame, the wheel frames are closed together. By rotating the shaft through 90° angle, the wheel frames, the foldable frame, the wheel holders and the wheels are collapsed and closely attached to the golf cart's main frame.

1 Claim, 8 Drawing Sheets

GOLF CART WHEEL FRAME MOUNTING STRUCTURE

BACKGROUND AND SUMMARY OF THE INVENTION

The present invention relates to a golf cart wheel frame mounting structure for a folding golf cart, which conveniently folded up without removing the golf bag which is placed thereon and, which has means to directly bear the pressure from the golf bag, so as to reduce the pressure applied at the wheel frames thereof.

Various folding golf carts have been disclosed. FIG. 1 illustrates a structure of folding golf cart which is comprised of two sections that can be conveniently folded up when it is not in use. FIGS. 2 and 3 illustrates another structure of folding golf cart which is consisted of three parts that can be conveniently collapsed. Neither of the said two structures of folding golf carts is practical in use. In these structures, the wheel frames may be damaged easily because they are directly connected to a seat frame which directly bears the pressure from the golf bag carried thereon. Further, in the folding golf cart of FIGS. 2 and 3, the parts thereof can be collapsed only when the golf bag has been removed therefrom.

The present invention has been accomplished to eliminate the aforesaid disadvantages. It is therefore an object of the present invention to provide a wheel frame mounting structure for a folding golf cart, which can be conveniently collapsed without removing the golf bag therefrom. It is another object of the present invention to provide a wheel frame mounting structure for a folding golf cart, which has means to bear the pressure from the golf bag which is placed thereon, so as to reduce the pressure applied at the wheel frames thereof.

DETAILED DESCRIPTION OF THE PREFERRED EMBODIMENT

Figure 1:
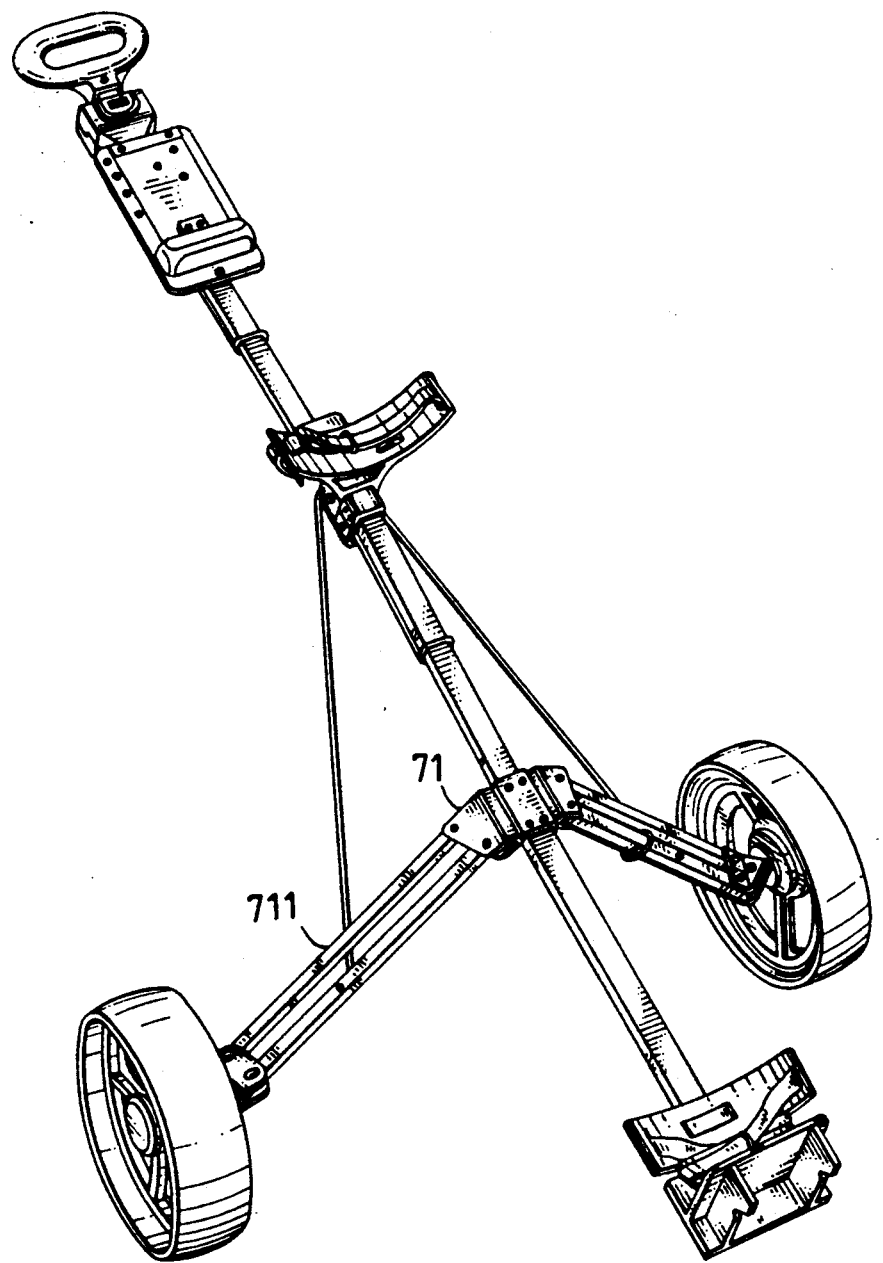
FIG. 1 is a perspective view of a golf cart which is comprised of a two-section type of folding cart frame constructed according to the prior art.
Figure 2:
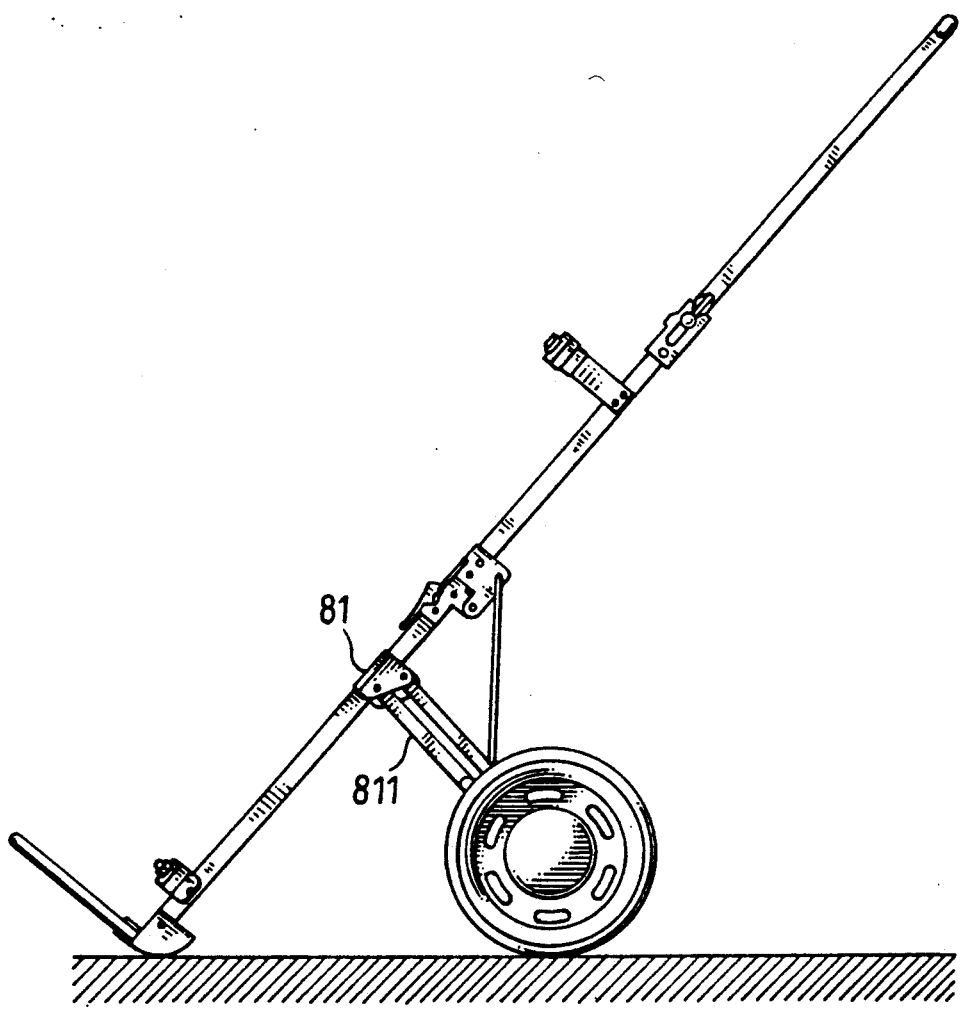
FIG. 2 is a side view of a golf cart which is comprised of a three-section type of folding cart frame constructed according to the prior art.
Figure 3:
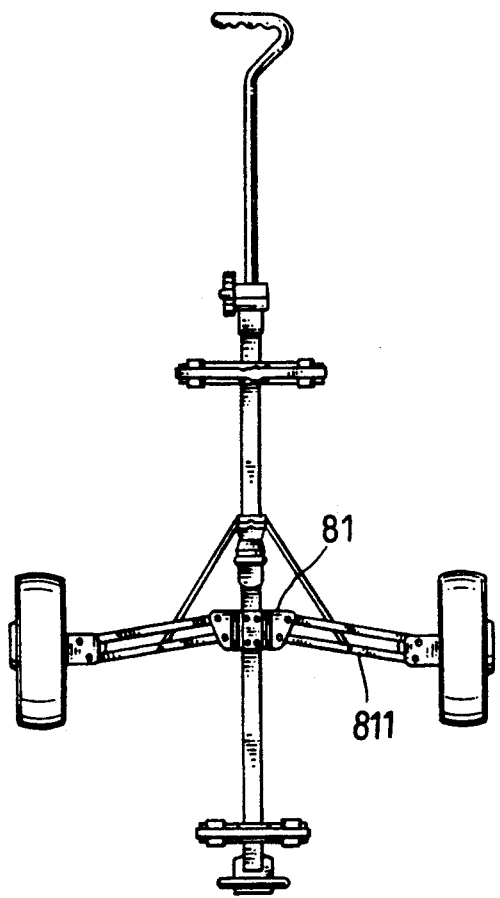
FIG. 3 is a front view of the golf cart of FIG. 2.
Figure 4:
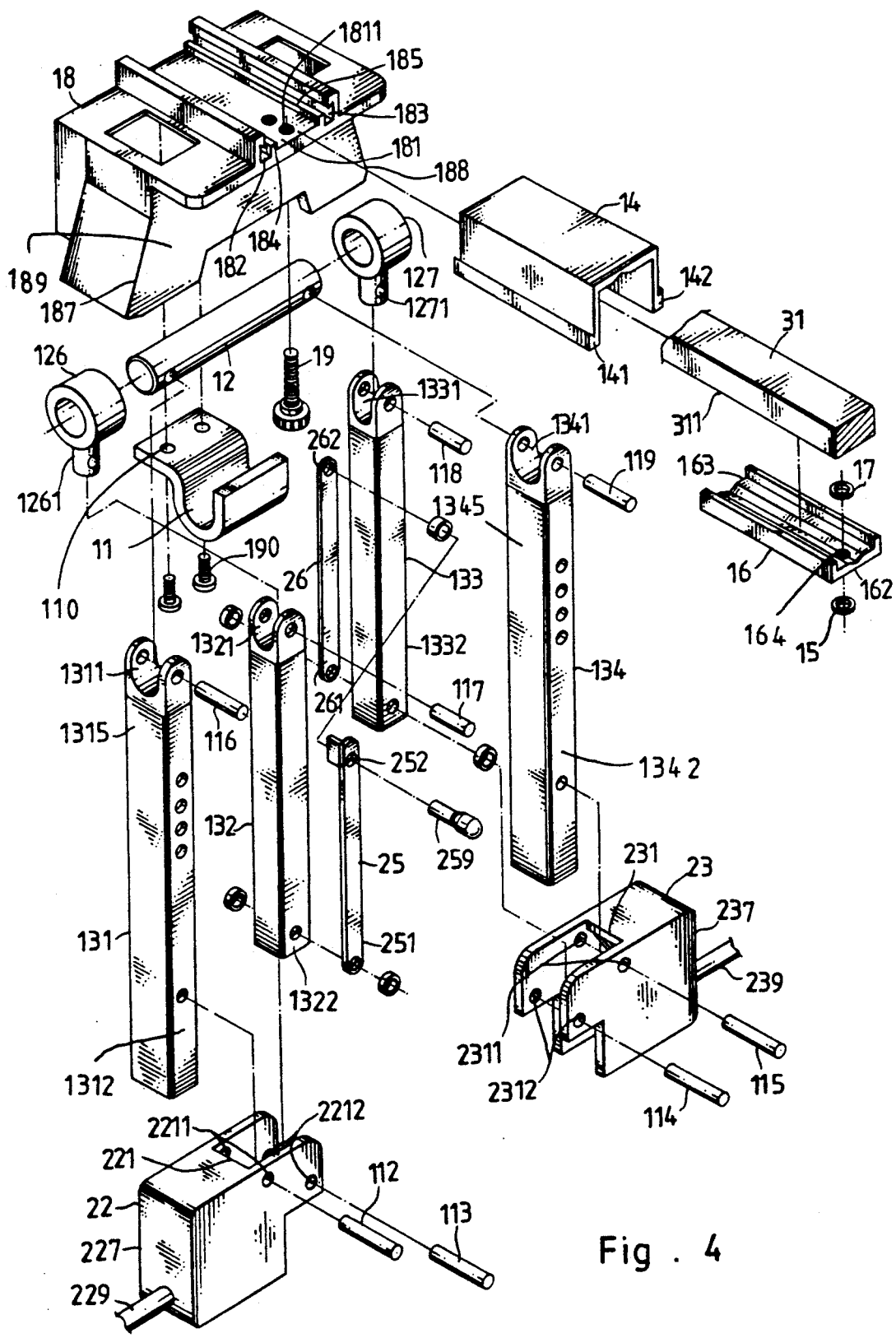
FIG. 4 is an exploded perspective view of the preferred embodiment of the wheel frame mounting structure of the present invention.
Figure 5:
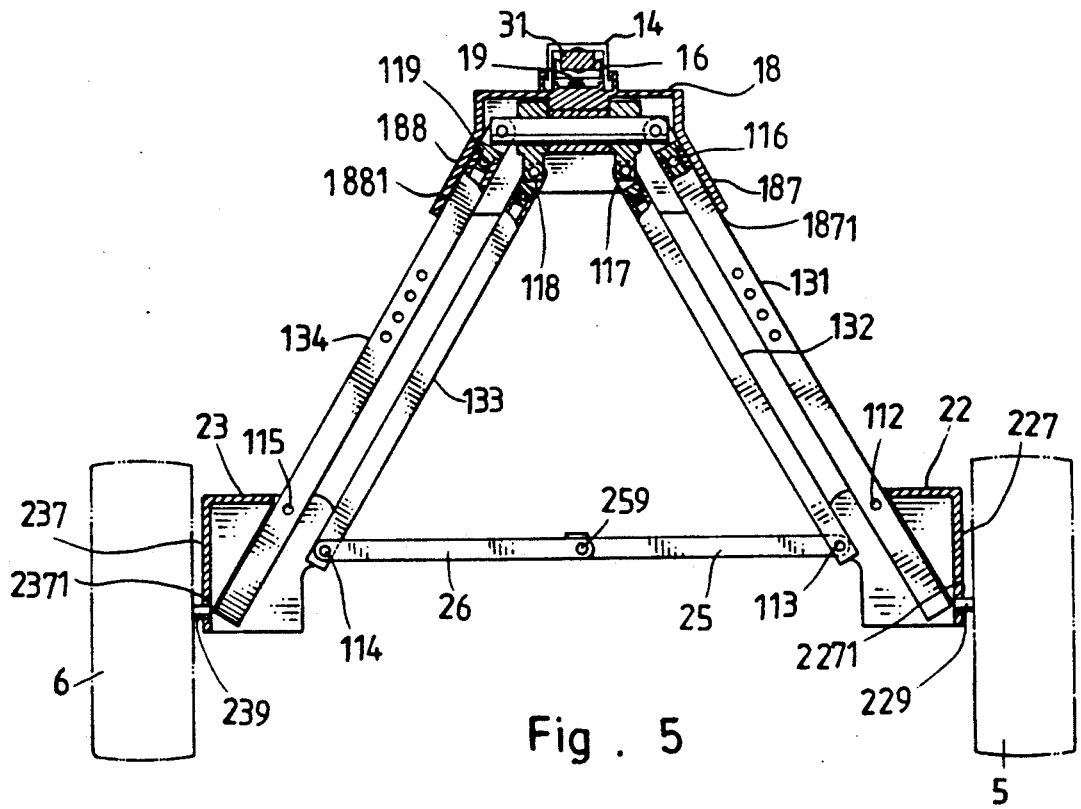
FIG. 5 is a sectional back view of the preferred embodiment of the wheel frame mounting structure of the present invention when it is expanded into a working position.

Referring to FIGS. 4 through 7, therein illustrated is the preferred embodiment of the golf cart's wheel frame mounting structure of the present invention which is generally comprised of a wheel frame holder 18 secured to a golf cart's main frame 31 by a mounting plate 14, a pressure plate 16 and a lock screw 19; a shaft 12 fastened in said wheel frame holder 18 at the bottom to hold a pair of left-hand wheel frames 131, 132 and a pair of right-hand wheel frames 133, 134; and two wheel holders 22, 23 secured to said wheel frames 131, 132, 133, 134 at the bottom for holding two wheels 5, 6.

The wheel frame holder 18 is made from a trapezoidal casing having a front projecting edge 181 which has a bolt hole 1811 made thereon for fastening the lock screw 19, two hook-shaped projecting strips 182, 183 upstanding from the top surface thereof which are disposed in transverse direction in parallel with each other, two elongated parallel rails 184, 185 on the top surface thereof within said two hook-shaped projecting strips at two opposite sides relative to said bolt hole 1811 and in height relatively lower than said two hook-shaped projecting strips, two opposite side walls 187, 188 obliquely extending downwards outwards at two opposite ends, and a front side wall 189 vertically extending downwards at the front and respectively connected to said two opposite side walls at two opposite ends. The back side (relative to the front side wall 189) of the wheel frame holder 18 is an opening. The mounting plate 14 is made from a channel iron having two hooked edges 141, 142 on the two opposite ends thereof for connecting the two hook-shaped projecting strips 182, 183 on the wheel frame holder 18 through hook joint. The pressure plate 16 has a groove 163 on he top edge thereof, a flat bottom edge 162, and a bolt hole 164 at a location corresponding to the bolt hole 1811 on the wheel frame holder 18.

Referring to FIG. 7 again, the mounting plate 14 is mounted on the golf cart's main frame 31 at the top at a suitable location and the pressure plate 16 is attached to the main frame 31 at the bottom with the groove 163 thereof disposed in contact with the bottom edge 311 of the main frame 31 and then, the wheel frame holder 18 is connected to the mounting plate 14 to firmly retain the pressure plate 16 to the main frame 31 by hooking up the hook-shaped projecting strips 182, 183 with the two hooked edges 141, 142 permitting the bolt hole 1811 on the wheel frame holder 18 to align with the bolt hole 164 on the pressure plate 16. Then, inserting the lock screw 19 in the bolt holes 1811, 164 to tightly press the main frame 31 against the mounting plate 14. During mounting process, two washers 15, 17 are mounted on the lock screw 19 with the first washer 15 squeezed between the wheel frame holder 18 and the pressure plate 16 and with the second washer 17 squeezed between the pressure plate 16 and the main frame 31.

Referring to FIGS. 4, 5 and 6 again, the shaft 12 is fastened in the wheel frame holder 18 at the bottom in longitudinal direction by a clamp 11 for holding the wheel frames 131, 132, 133, 134. The clamp 11 has two through-holes 110 through which two screws 190 are inserted in two bolt holes (not shown) on the bottom edge 1818 of the wheel frame holder 18 to secure the clamp 11 in place. The wheel frames each has a recessed top end 1311, 1321, 1331 or 1341 at one end, wherein the recessed top end 1311 of the first left-hand wheel frame 131 is pivoted to the shaft 12 at one end by a pin 116; the recessed top end 1341 of the first right-hand wheel frame 134 is pivoted to the shaft 12 at an opposite end by a pin 119; the recessed top end 1321 of the second left-hand wheel frame 132 is pivoted to a connecting end 1261 on a connector 126, which is mounted on the shaft 12 through sleeve joint and retained between the first left-hand wheel frame 131 and the clamp 11, by a pin 117; the recessed top end 1331 of the second right-hand wheel frame 133 is pivoted to a connecting end 1271 on a connector 127, which is mounted on the shaft 12 through sleeve joint and retained between the first right-hand wheel frame 134 and the clamp 11, by a pin 118. The left-hand wheel holder 22 is attached to the first and second left-hand wheel frames 131, 132 at the bottom for holding the left-hand wheel 5 while the right-hand wheel holder 23 is attached to the first and second right-hand wheel frames 133, 134 at the bottom for holding the right-hand wheel 6. As illustrated, each wheel holder 22 or 23 is made from a hollow frame having a vertical wall 227 or 237 at one end, a wheel axle 229 or 239 transversely extending outwards from said vertical wall 227 or 237 for holding the wheel 5 or 6, and an U-shaped support 221 or 231 transversely extending from the top edge thereof at an opposite end, wherein said U-shaped support 221 or 231 has two pairs of pin holes 2211, 2212; 2311, 2312, for connecting the bottom ends 1312, 1322; 1332 1343 of the left-hand or right-hand wheel frames 131, 132; 133, 134 by pins 112, 113; 114, 115. Further, there is provided a foldable frame connected between the bottom ends 1322, 1332 of the second left-hand and second right-hand wheel frames 132, 133. The foldable frame is comprised of two connecting rods 15, 16 each of which having two pin holes 251, 252; 261, 262 at two opposite ends. The two connecting rods 25, 26 are pivoted at one end by a pin 259 which inserts through the pin holes 252, 262. The opposite end of the first connecting rod 25, namely, the pin hole 251 is secured to the pin holes 2212, by the pin 113; the opposite end of the second connecting rod 26, namely, the pin hole 261 is secured to the pin holes 2312 by the pin 114.

After assembly, the two opposite side walls 187, 188 of the wheel frame holder 18 and the two vertical walls 227, 237 of the two wheel holders 22, 23 confine the outward expanding range of the wheel frames 131, 134. Once the wheel frames 131, 132, 133, 134 are bilaterally expanded, the two connecting rods 25, 26 are stretched to align with each other longitudinally and, the outer surface 1315 or 1345 of the first left-hand wheel frame 131 or the first right-hand wheel frame 134 is stopped against the inner surface 1871 or 1881 of the vertical side wall 187 or 188 of the wheel frame holder 18 and also stopped against the inner surface 2271 or 2371 of the vertical wall 227 or 237 of the wheel holder 22 or 23 at the bottom. By means of the support of the two vertical side walls 187, 188 of the wheel frame holder 18 and the two vertical walls 227, 237 of the two wheel holders 22, 23 , the wheel frames 131, 132, 133, 134 can stably bear a heavy load.

Figure 6:
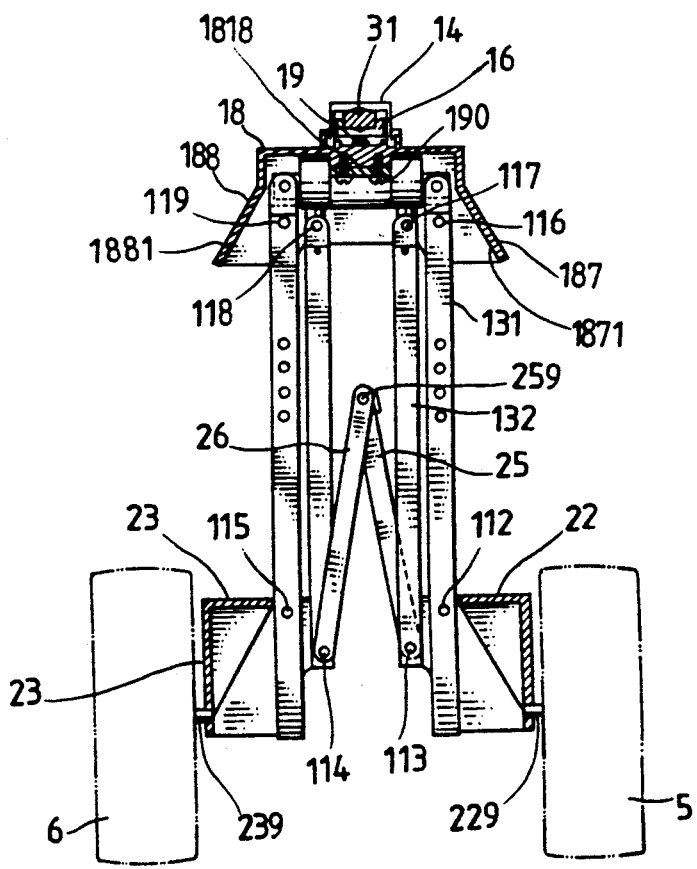
FIG. 6 is another sectional back view of the preferred embodiment of the wheel frame mounting structure of the present invention when it is folded up.
Figure 7:
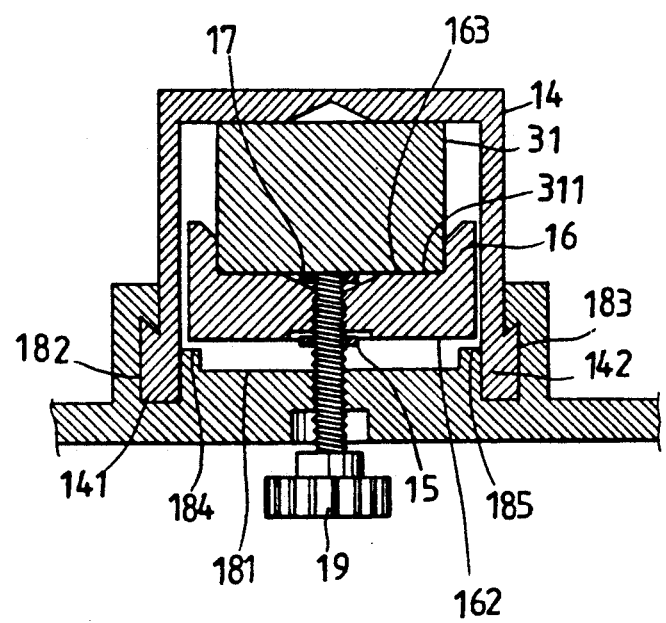
FIG. 7 is a cross section showing that the wheel frame holder and the pressure plate are secured to the golf cart's main frame by the mounting plate and the lock screw.
Figure 8:
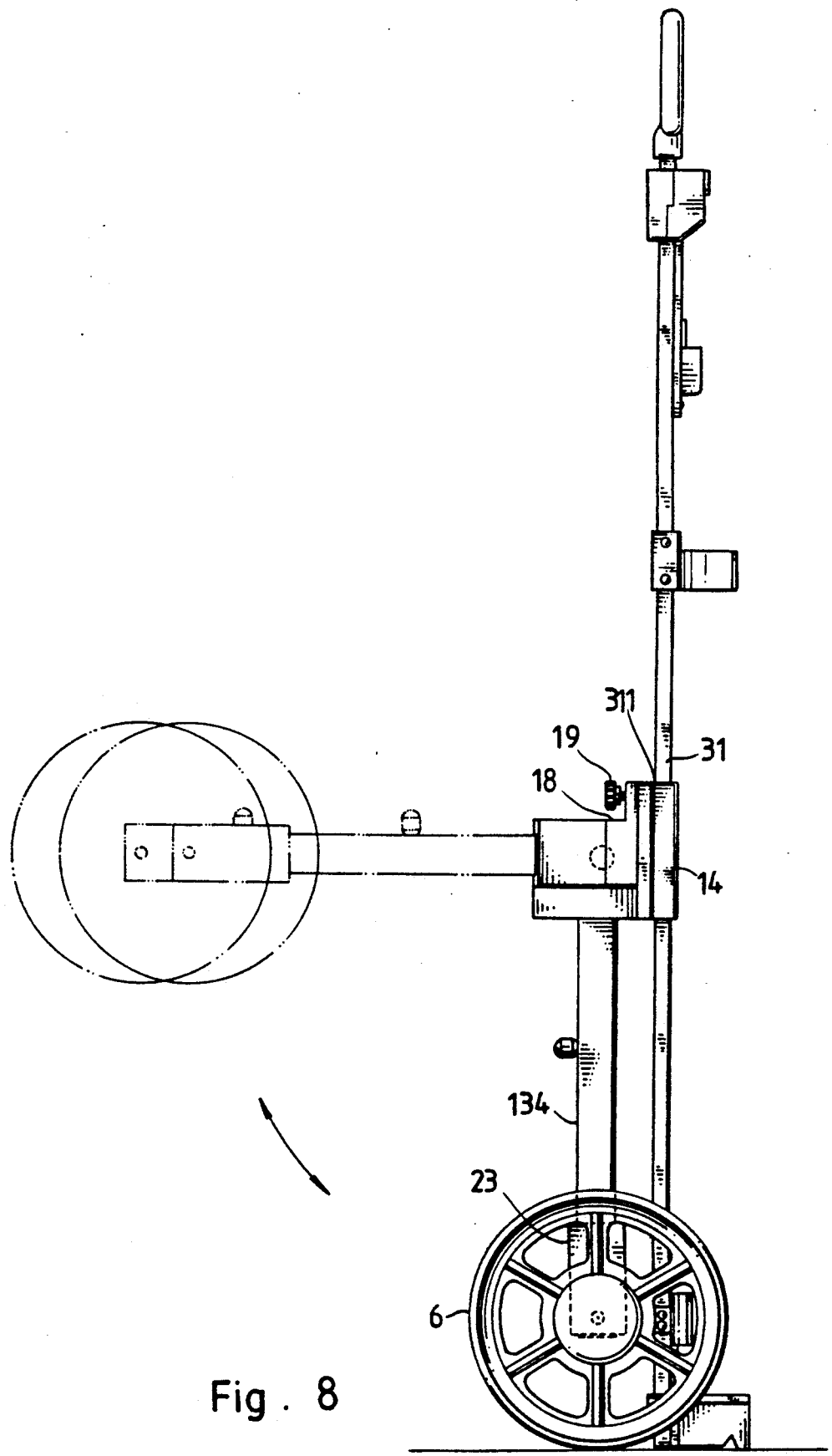
FIG. 8 is a side view showing the operation in rotating the wheel frames, the wheel holders and the wheels toward the main frame of the golf cart.
Figure 9:
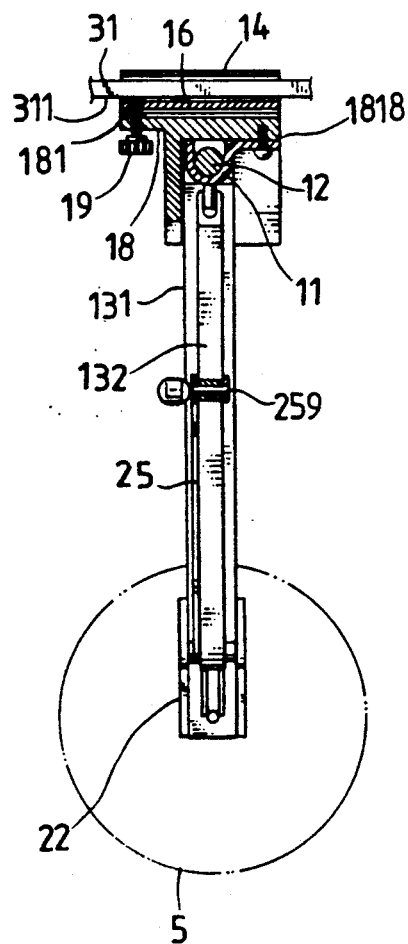
FIG. 9 is a sectional side view thereof before collapsing.
Figure 10:
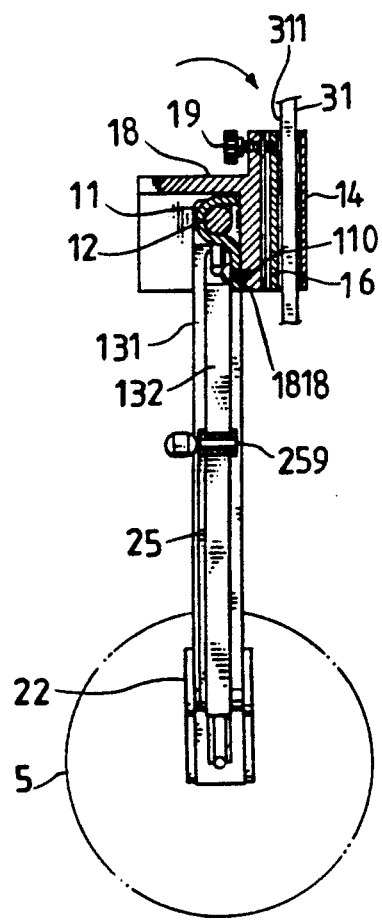
FIG. 10 is the sectional side view thereof after collapsing.

By folding up the two connecting rods 25, 26, the wheel frames 131, 132, 133, 134, the two wheel holders 22, 23 and the two wheels 5, 6 are attached together (as shown in FIG. 6). Then, the shaft is rotated through 90° angle causing the wheel frames 131, 132, 133, 134, the two wheel holders 22, 23 and the two wheels 5, 6 to be collapsed and then closely attached to the main frame 31 of the golf cart (as shown in FIGS. 8, 9 and 10).

Therefore, the whole structure of the present invention can be conveniently collapsed and attached to the main frame 31 of the golf cart without unloading the golf bag (not shown).

I claim:

1. A golf cart wheel frame mounting structure, the improvement comprising:

a wheel frame holder made from a trapezoidal casing, two hook-shaped projecting strips upstanding from the top surface thereof at two opposite locations, two elongated parallel rails on the top surface thereof within said two hook-shaped projecting strips, two opposite side walls obliquely extending downwards outwards at two opposite ends, a front side wall vertically extending downwards at the front and respectively connected to said two opposite side walls at two opposite ends, and an opening opposite to said front side wall;

a mounting plate mounted on a golf cart's main frame to secure said wheel frame holder thereto, said mounting plate being made from a channel iron having two hooked edges on the two opposite ends thereof respectively engaged with said two hook-shaped projecting strips through hook joint;

a pressure plate having a flat bottom edge stopped at said two elongated parallel rails and a groove on the top edge thereof attached to said main frame at the bottom;

a lock screw inserted through a bolt hole on said wheel frame holder and a bolt hole on said pressure plate to tightly press said main frame against said mounting plate;

a shaft fastened in said wheel frame holder at the bottom in longitudinal direction by a clamp, said clamp being secured to said wheel frame holder by screws;

a first left-hand wheel frame having a top end pivoted to said shaft at one end;

a first right-hand wheel frame having a top end pivoted to said shaft at an opposite end;

a first connector mounted on said shaft through sleeve joint and retained between said first left-hand wheel frame and said clamp;

a second connector mounted on said shaft through sleeve joint and retained between said first right-hand wheel frame and said clamp;

a second left-hand wheel frame having a top end pivoted to said first connector;

a second right-hand wheel frame having a top end pivoted to said second connector;

a left-hand wheel holder made from a hollow frame having a left-hand vertical wall at one end, a wheel axle transversely extending outwards from said left-hand vertical wall for holding a left-hand wheel, and a right-hand U-shaped support transversely extending from the top edge thereof at an opposite end, said right-hand U-shaped support having a first pair of pin holes for connecting the opposite end of said first left-hand wheel frame by a pin and a second pair of pin holes for connecting the opposite end of said second left-hand wheel frame by a pin;

a right-hand wheel holder made from a hollow frame having a right-hand vertical wall at one end, a wheel axle transversely extending outwards from said right-hand vertical wall for holding a right-hand wheel, and a left-hand U-shaped support transversely extending from the top edge thereof at an opposite end, said left-hand U-shaped support having a first pair of pin holes for connecting the opposite end of said first right-hand wheel frame by a pin and a second pair of pin holes for connecting the opposite end of said second right-hand wheel frame by a pin;

a foldable frame comprised of two connecting rods pivoted at one end, said foldable frame having two opposite ends respectively pivotably connected to said second left-hand wheel frame and said second right-hand wheel frame;

wherein said foldable frame can be folded up to close said first and second left-hand wheel frames, said first and second right-hand wheel frames, said left-hand and right-hand wheel holders and said left-hand and right-hand wheels together; said shaft being rotated through 90° angle causing said first and second left-hand wheel frames and said first and second right-hand wheel frames to be collapsed and closely attached to said main frame.

* * * * *